United States Patent [19]

Hu

[11] Patent Number: 5,299,256
[45] Date of Patent: Mar. 29, 1994

[54] PBX TELEPHONE WITH MESSAGE PRINTER

[75] Inventor: Liang-Te Hu, Diamond Bar, Calif.

[73] Assignee: Kabushiki Kaisha Toshiba, Kanagawa, Japan

[21] Appl. No.: 701,862

[22] Filed: May 17, 1991

[51] Int. Cl.⁵ .......................................... H04M 11/00
[52] U.S. Cl. .................................... 379/96; 379/157; 379/110; 379/387; 379/442
[58] Field of Search ........................... 379/52, 96–98, 379/100, 156–157, 165, 214, 218, 201, 93, 94, 99, 142, 88, 442, 110, 354, 130–132, 387

[56] References Cited

U.S. PATENT DOCUMENTS

| | | | |
|---|---|---|---|
| 4,575,584 | 3/1986 | Smith et al. | 379/2 |
| 4,585,904 | 4/1986 | Mincone et al. | 379/131 |
| 4,611,277 | 9/1986 | Kemppainen et al. | 379/96 |
| 4,837,798 | 6/1989 | Cohen et al. | 379/88 |
| 4,975,896 | 12/1980 | D'Agosto, III et al. | 379/96 |

FOREIGN PATENT DOCUMENTS

| | | |
|---|---|---|
| 63-207257 | 8/1988 | Japan . |
| 63-316559 | 12/1988 | Japan . |
| 1-152862 | 6/1989 | Japan . |
| 2-143662 | 6/1990 | Japan . |

*Primary Examiner*—Wing F. Chan
*Attorney, Agent, or Firm*—Spensley Horn Jubas & Lubitz

[57] ABSTRACT

A digital telephone for use as a PBX station includes a display for displaying information such as called number and call duration as well as messages from other stations or from a message center associated with a PBX system. The station includes a printer mechanism having the capability to print information corresponding to what is currently displayed on the display as well as messages from other stations or from the message center. Provision of the printer enables a hard copy printout of messages and calling information to be obtained.

23 Claims, 5 Drawing Sheets

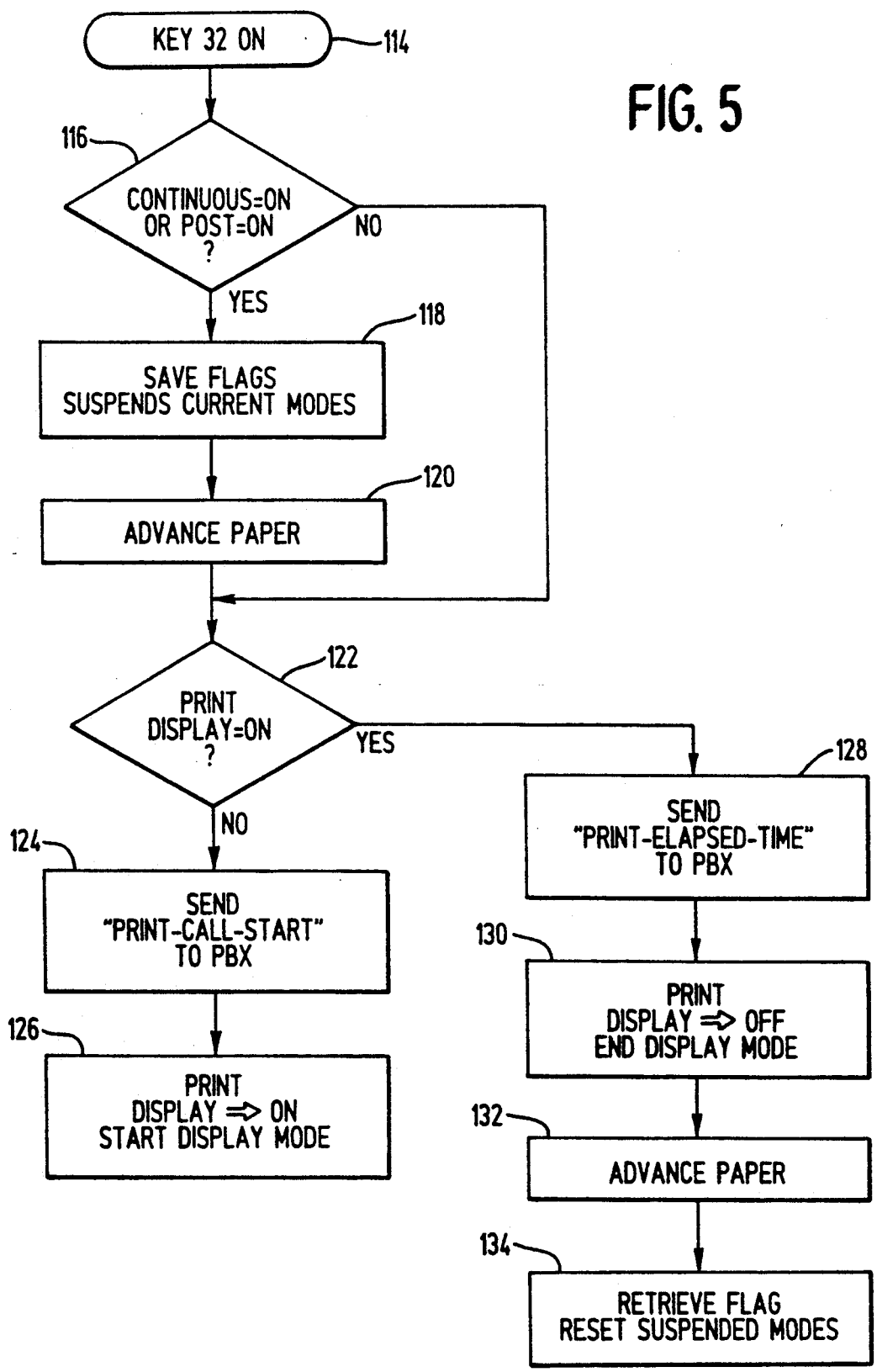

PBX TELEPHONE WITH MESSAGE PRINTER

BACKGROUND OF THE INVENTION

1. Field of the Invention

This invention relates to private branch exchange (PBX) telephone systems and more particularly to PBX telephone systems having a station messaging capability.

A PBX system generally operates with at least one attendant console and a number of individual telephone stations. The PBX system includes the ability to route calls internally from station to station as well as providing each station with access to an outside telephone line. All calls originating from outside the PBX system are initially received at the attendant console and routed by an attendant to the appropriate station.

2. Description of Related Art

Many PBX systems currently used are fully digital and incorporate digital stations. Such stations often have operational capabilities beyond a mere telephone speech transmission. In particular, it is now common for digital PBX stations to be provided with an alphanumeric display for the purpose of providing information to the station user. The display is typically a liquid crystal display (LCD) of a relatively small size such as four rows of thirty characters each. The displays can provide information such as clock/calendar, call duration, dialed number and calling number. In addition, the displays may be used to register messages from a message center associated with the PBX system (for example controlled by the attendant console) or from other stations. Digital signals are transmitted either along the telephone line itself or along a separate dedicated line and employed to drive the display to register a message. For example, when a caller from one station calls another station and there is no answer, the caller may register a message at the called station indicating the name/number of the caller and requesting that the call be returned. Similarly, calls from outside of the PBX system may be taken by the attendant and an appropriate message may be transmitted to the station display.

SUMMARY OF THE INVENTION

The present invention significantly enhances the utility of a PBX station which has a display capability by providing a message printer with the station. The printer can be employed to both print information displayed on the display and in addition to post messages which are sent to the station, whether or not such messages are displayed. A hard copy printout can thus be provided for various displays and messages, thereby greatly enhancing the utility of the PBX station.

One use of the station message printer is to provide a log of a telephone call. For example, when a call is initiated, the display may indicate the number which is being dialed. The printer is provided with a control to cause the display contents to be printed, and this control is initially activated immediately after the station user places a call. After the call is connected, the display may switch to an indication of elapsed time of the call. Near the end of the call, the station user can again activate the printer to cause it to print the call duration. The station user therefore is provided with a hard copy indicating the call destination and the call duration. This may be useful, for example, in professional offices to facilitate billing with respect to telephone calls. Although many PBX systems maintain records of calls made from a station, they do not provide an immediate record and the information is maintained at the PBX system and not at the station. The present invention provides the ability of the actual station user to receive an immediate printout of call information.

The message printer may also be used for the printing of text messages from other stations or outside callers. This may be especially useful, for example, for a secretary who receives messages at a single station for a number of managers. Messages may be printed out as they come to the station, or may be stored in memory for subsequent printout. In either case, the need for filling out handwritten message slips to indicate the messages provided on the display is unnecessary. Rather, a printed copy of each message can be directly provided and distributed to the appropriate personnel.

The phone station and message printer can also be used in a hotel environment to provide the hotel guest with both message information and potentially with billing information. Generally, in a hotel environment a message center is maintained with the central PBX system and a guest room telephone is provided with a message waiting indicator lamp which is illuminated to indicate to a guest that there is a message in the message center. The guest must then call the hotel operator to retrieve the message. With the message printer of the present invention, the message center may directly transmit a hard copy message to the guest room, thus avoiding the need to have the guest call for a message. In addition, with printing capability in the room, the guest may be provided with a hard copy of billing information.

BRIEF DESCRIPTION OF THE DRAWINGS

The invention will be described with reference to the accompanying drawings, wherein:

FIGS. 3-5 are flow charts illustrating the different modes of operation of the telephone and message printer of the present invention.

DETAILED DESCRIPTION OF THE INVENTION

The following description is of the best presently contemplated mode of carrying out the invention. The description is made for the purpose of illustrating the general principles of the invention and is not to be taken in a limiting sense. The scope of the invention is best determined by reference to the appended claims.

Figure 1:
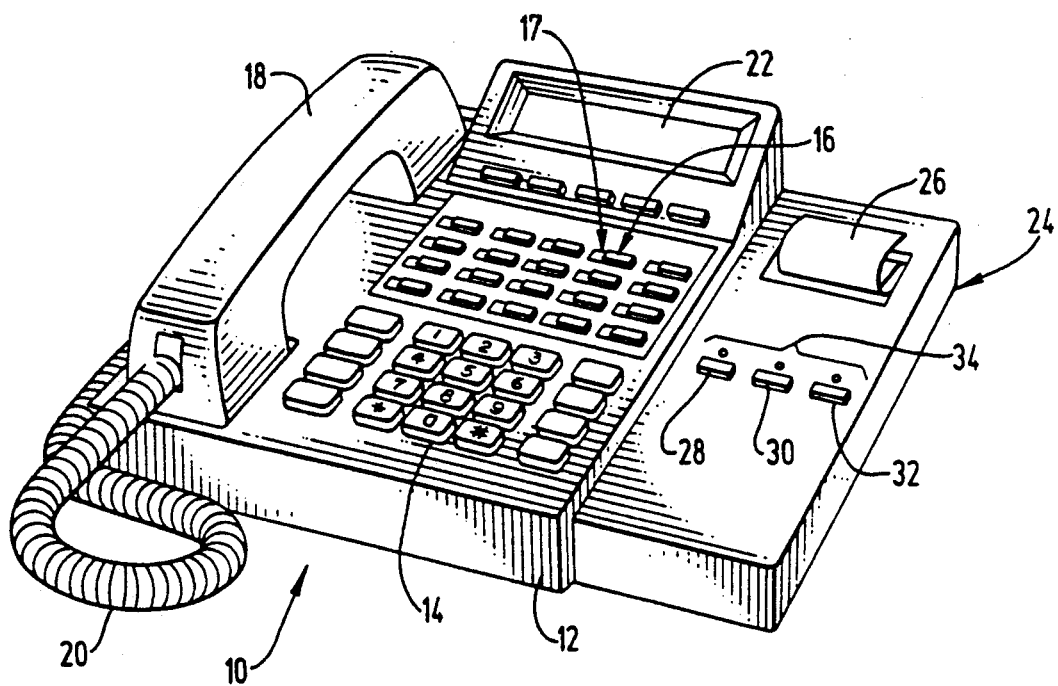
FIG. 1 is a perspective view of a PBX telephone station having a message display and a message printer.

Referring to FIG. 1, a PBX telephone station 10 includes a base 12 having a keypad 14 containing fixed operation keys for telephone dialing and other standard telephone operations. An additional group of keys 16 is provided, with each key being programmable for various features, such as speed dialing of programmed telephone numbers. The keys 16 are provided with associated LED's 17 to indicate their operational status. A handset 18 is supported by the base and coupled to it via a cord 20.

The telephone station 10 includes an LCD display 22 for providing message and status information to the user. In the present embodiment, the display is a four row, 30-character alphanumeric liquid crystal display.

The display is employed to display such information as calling/called number and name, call waiting number and name, clock/calendar, dialed number and call duration. Significantly, for the present invention, the display is also used to display messages from another station or from a message center associated with the PBX system.

A printer unit 24 is provided with the telephone station 10 and includes a simple printer mechanism such as a dot matrix printer to enable information from the display 22 as well as outside message information to be printed so as to provide a hard copy to the station user. In the preferred embodiment, the printer has the capability of printing the same number of characters per line (i.e., thirty) as can be displayed on the display 22. The printing is accomplished on standard printing paper 26. It will be appreciated that many different types of printer mechanisms could be employed, with a simple dot matrix printer similar to those employed with portable calculators and the like currently being preferred.

The printer 24 may be provided with many different controls, depending on the printing functions which are desired. In the illustrated embodiment, the printing functions are relatively simple and the printer is controlled by means of three keys 28, 30 and 32. The pressing of these keys activates various printing functions, as will be described subsequently. The keys 28, 30 and 32 include associate LEDs 34 to indicate their operational status.

Figure 2:
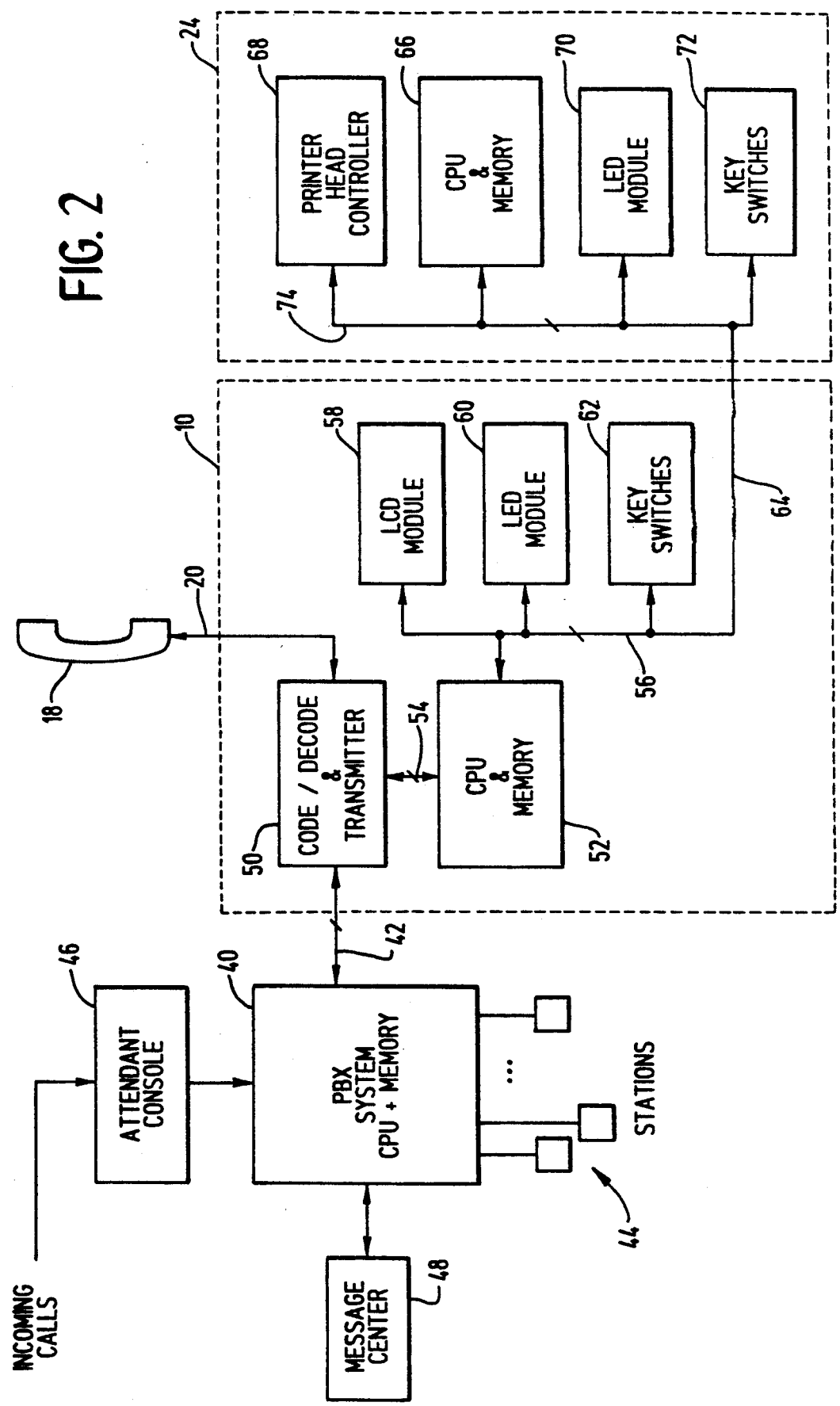
FIG. 2 is a block diagram of the telephone and message printer of the present invention shown connected to a PBX system.

FIG. 2 is a block diagram illustrating the telephone station 10 and printer 24. The station 10 is fully digital, i.e., speech signals are transmitted to and from the station in digital form using PCM coding. The station is intended to function within an overall PBX telecommunication system and is coupled to a central PBX system 40 via a line 42. In the present embodiment, a single twisted pair line is employed for voice, data and power connections between the PBX system and the station (voice and data communication is bidirectional and the station is powered from the PBX system). In addition to the station 10, a plurality of additional stations 44 are also connected to the PBX system, as is an attendant console 46. All incoming calls from outside of the PBX are initially received at the attendant console 46 and then routed to the appropriate station by the attendant.

A message center 48 is also connected to the PBX system 40. This message center is employed to store digital messages for the various stations coupled to the PBX system. In operation, digital messages may be sent to the station 10 by other stations 44, the attendant console 46 or the message center 48 (typically under control of the attendant console 46). For example, when an incoming call is received and the station 10 is not receiving calls (e.g., a do not disturb function has been activated) or does not answer, the attendant may send a digital message either directly to the station 10 for storage or store a message in the message center 48 for subsequent delivery to the station 10. In addition, other stations 44 may have a limited messaging capability (e.g., the ability to send a fixed number of predefined text messages) for communication to other stations.

The station 10 includes a code/decode and transmitter unit 50 which receives digital speech signals along line 42 and decodes them into analog signals which are provided to the earpiece of handset 18. The unit 50 also receives analog speech signals from the handset 18 and codes them into digital signals for transmission to the PBX system 40 on line 42. In addition to processing speech signals, the code/decode and transmitter unit 50 separates digital control signals (including message signals) and power signals from the speech signals. The power signals are applied to appropriate power circuitry (not shown) to power the station 10, and the control signals are provided to a central processing unit (CPU) and memory 52 via a bus 54. The memory associated with the CPU may include a program memory and a working memory. The working memory may have sufficient capacity to store a number of digital messages transmitted to the station 10. Alternatively, the system may be configured such that messages are not stored directly in the station 10 but rather are stored in the message center 48 and are accessed by having the CPU 52 generate a message request, as will be described subsequently.

The CPU and memory 52 is connected to a primary station bus 56, which is in turn connected to an LCD module 58 which includes circuitry for driving the LCD display 22, an LED module 60 used for driving the LEDs 17 associated with the programmable keys 16 and a key module 62 which detects activation of any of the keys 14 and 16.

The CPU 52 communicates with the PBX system 40 via the code/decode and transmitter unit 50, and communicates with the LCD module 58, LED module 60 and key switches 62 to appropriately control the station 10. However, in addition to being connected via the bus 56 to the circuits 58, 60 and 62, the CPU 52 is also coupled to the printer 24 by means of a bus extension 64. More specifically, the printer 24 includes its own CPU and memory 66, a printer head controller 68, an LED module 70 for driving the LEDs 34 and key switches 72 coupled to the keys 28, 30 and 32. These components in the printer are coupled to each other by means of a printer bus 74, which is also connected to the bus extension 64 for communication with the bus 56 of the station 10. The CPU 66 operates to control the printer head controller 68 to control all of the printing operations, including paper advance, carriage movement and the printing operation. The CPU 66 also detects operation of the key switches 72 to initiate and suspend various printing operations and in addition provides drive signals to the LED module 70. It should be noted that the printer 24 may be powered from the PBX system 40 as is the station 10 or may be independently powered.

The operation of the invention will be described with reference to several printing functions which may be provided for the station. These printing functions are exemplary only, and the system could be configured to provide numerous printing capabilities depending upon the application. In addition, although the system is illustrated as having a separate CPU 66 contained within the printer unit 24, the printer could be controlled directly by the CPU 52 contained in the station 10.

Examples of printing functions which may be provided for the station 10 include a "continuous" print mode in which messages are printed as they come to the phone (station) when a call is made to the station, a "posting" mode in which messages which have previously been stored in the message center 48 (or alternatively, directly in the CPU and memory of station 52, or PBX 40) are retrieved and printed, and a "print display" mode in which whatever is currently being displayed on the display 22 is printed. With respect to the posting mode, it is noted that a number of PBX systems include text message centers integrated with the PBX (such as the message center 48) and one station may request a printout of all messages stored for that particular station or possibly for additional stations as well. This is useful, for example, for a secretary who serves several managers within a department and performs message posting for the entire department. Flow charts illustrating the operations performed by the CPU 66 for each of the three modes are illustrated in FIGS. 3, 4 and 5, respectively.

Figure 3:
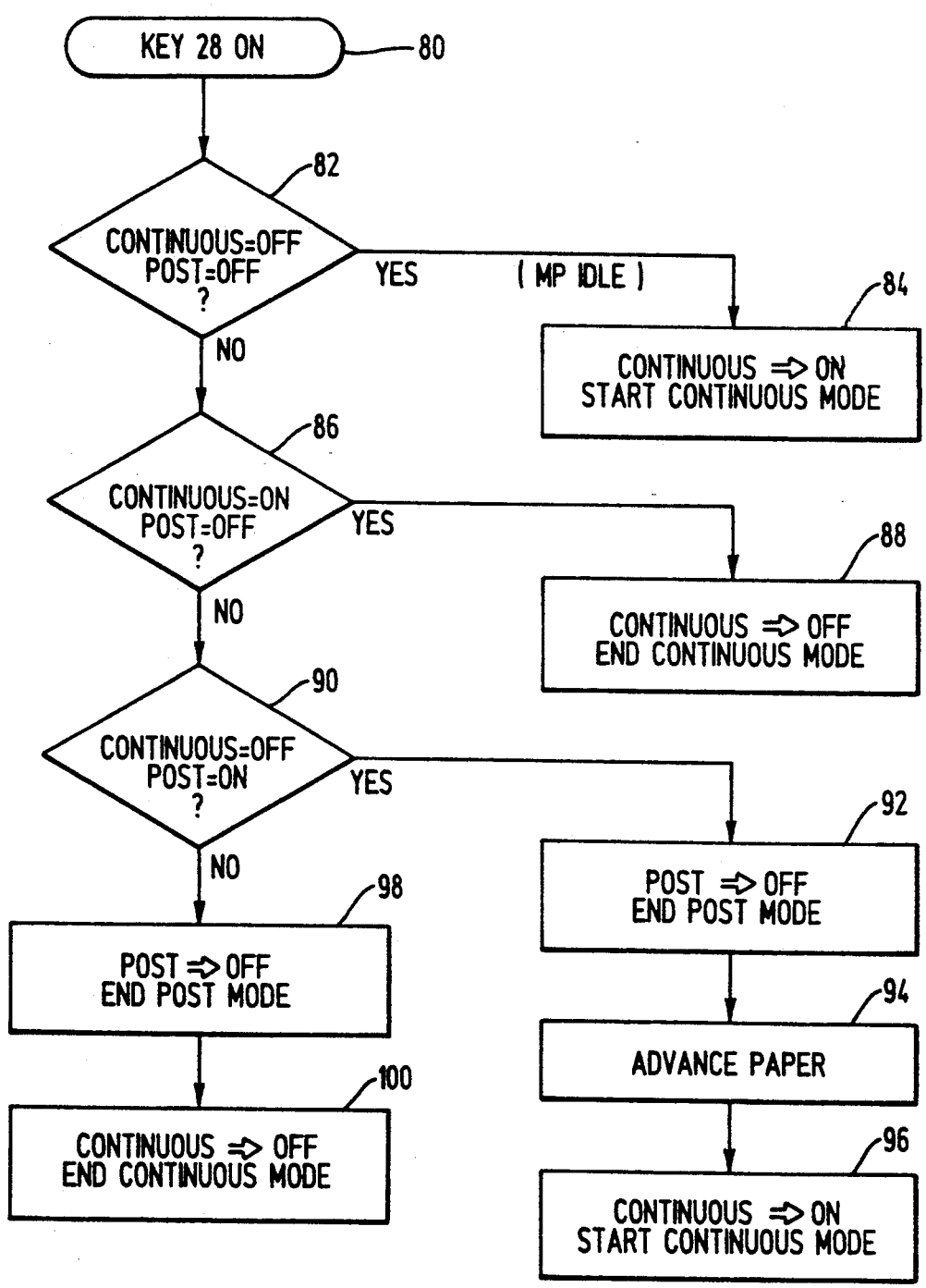
Figure 4:
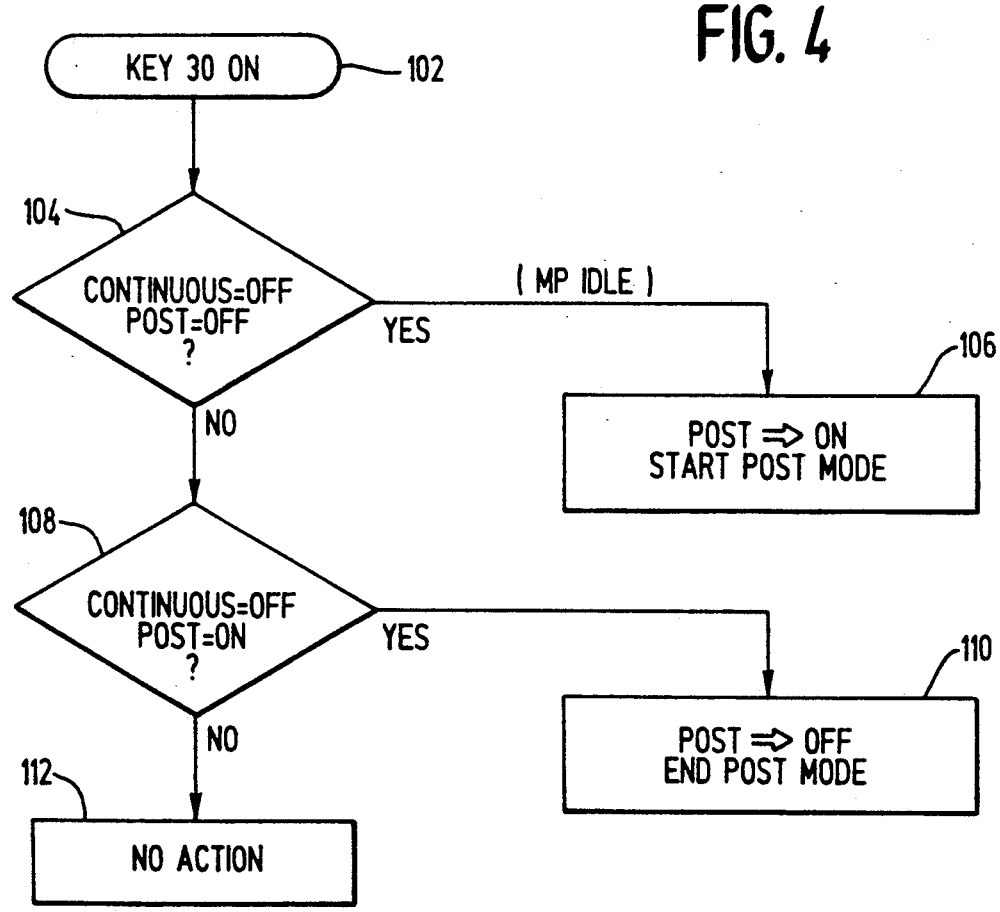

Referring to FIG. 3, the operations for the continuous mode will be described. This mode is controlled by the key 28, which has a push-on/push-off operation. That is, the key 28 is initially pressed to activate the continuous mode and subsequently pressed to deactivate the continuous mode. When the continuous mode is deactivated and no other mode is active, the message printer is idle, which is useful, for example, when the paper supply in the printer needs to be changed. The "idle" mode of the message printer is indicated by all LEDs 34 turned off.

When depression of the key 28 is detected, step 80, a determination is initially made as to whether a continuous mode flag and posting mode flag indicating operational status of the system are both off. If they are, the message printer 24 is idle, and the continuous flag is turned on and the continuous printing mode is begun, step 84. In this mode, the CPU 66 communicates with the CPU 52 and causes digital messages to be printed as they are received at the station 10. If the station user is away from the station, for example, this mode would be activated to enable messages to be transmitted to the station and printed while the station user was absent.

If the determination at step 82 is that at least one of the continuous and posting flags are not off, a determination is made as to whether the continuous flag is on, step 86. If so, the continuous flag is turned off and the continuous mode is ended, step 88, thus returning the printer to its idle state. If not, a determination is then made as to whether the continuous flag is off and the posting flag is on, step 90. If so, it is an indication that the posting mode is on. The continuous mode is given priority over the posting mode, and the posting flag is therefore turned off and the posting mode ended, step 92. The paper is then advanced by three spaces, step 94, to leave a space between messages and the continuous flag is turned on and the continuous mode initiated, step 96.

If the answer at step 90 is no, it is an indication of an error condition, since both the continuous and posting modes cannot be on simultaneously. In this case, the posting and continuous modes are turned off, steps 98 and 100, to return the printer to its idle state.

The operations performed in response to depression of the key 30 are illustrated in FIG. 4. This key is employed to activate the message posting mode. In this mode, the CPU 66 sends a request to the CPU 52 for messages stored in its memory or, alternatively, in the message center 48. If messages are stored in the message center 48, the CPU 52 in turn sends a request to the PBX system 40. Any stored messages are then retrieved and printed by the printer 24.

When depression of the key 30 is detected, step 102, a determination is made as to whether both the continuous and posting flags are off, step 104. If so, the message printer is idle, and the posting flag is turned on and the posting mode is begun, step 106. If both of the continuous and posting flags are not off, a determination is made as to whether the continuous flag is off and the posting flag is on, step 108. If so, the posting flag is turned off and the posting mode ended, step 110. The key 30 thus operates as a push-on/push-off switch as is the case with the key 28. If the result of step 108 was no, it is an indication that the continuous flag is on and that the continuous printing mode is activated. The user must stop the continuous printing mode by pressing the key 28, and therefore if the key 30 is pressed while the printer is in the continuous printing mode, no action will be taken, step 112.

Operations for the print display mode are illustrated in FIG. 5. This mode is activated by the key 32, step 114. This mode is employed to print whatever is currently being displayed on the display 22. FIG. 5 illustrates a specific control operation in which the print display mode is used to provide a printout of a telephone number which is called from the station and the duration of the telephone call. In the station 10, the called number is initially displayed prior to the call going through and subsequently the elapsed time of the call is displayed. The operation illustrated in FIG. 5 causes the information displayed to be printed at the appropriate time so that a hard copy is obtained indicating both the number called and the call duration.

When detection of depression of the key 32 is detected, a determination is initially made as to whether or not either the continuous or posting flags are on, step 116. If so, the activated flag is saved and the printing mode is suspended, step 118, and the paper advanced, step 120. If not, steps 118 and 120 are skipped. A determination is then made as to whether or not the print display flag is on, step 122. If not, it is an indication that the display mode is just being initiated, and a "print-call-start" signal is sent to the CPU 52 and on to the PBX system 40, step 124. The print display flag is then turned on and the print display mode initiated, step 126. Information currently displayed on the display 22 will thus be printed. This information will be the telephone number dialed by the station.

After the initial printing of the display at the beginning of a call in response to depression of the key 32 by the station user, the program returns and waits for another depression of the key 32, indicating that the current display should again be printed. The key 32 will be depressed by the station user a second time just prior to the end of a telephone call, while the elapsed time of the call is being displayed on the display. When the key 32 is depressed, step 114, a determination will be made at step 116 that the continuous and posting flags are off, and a determination will be made at step 122 that the print display flag is on (since it had been turned on in response to the initial depression of the key 32). A request to print the elapsed time now displayed on the display 22 will be sent to the PBX system 40 via the CPU and memory 52 (or just to the CPU and memory 52 if it controls elapsed time generation), step 128, and the elapsed time will be printed. The print display flag is then turned off and the display mode is ended, step 130. The paper is advanced, step 132, and the previous printing mode restored, step 134.

The turning on and off of the LEDs 34 are associated with the switches 28, 30 and 32 is also controlled by the CPU 66 but is not indicated in FIGS. 3–5. It should be noted that although the printing function has been described in connection with the provision of a separate CPU in the printer 24, the printing could be controlled by the main CPU 52 in the station 10, thus eliminating the need for a separate CPU in the printer. In addition, it may be useful to have most of the printing functions controlled by the PBX system 40 instead of by an individual station. The messages to be printed could be formatted by and transmitted from the PBX upon receipt of a message print request from the digital telephone. This configuration would facilitate the incorporation of new print functions by modifying the PBX system as opposed to having to modify each station and/or printer.

Although the invention has been described with reference to use with a digital telephone station having a single telephone line for carrying digital speech, digital data including message data, and power signals, the invention could be employed with stations having separate speech and data lines and could be employed with non-digital stations, i.e., conventional analog telephones which include a message display capability.

The specific printing features to be incorporated will be greatly dependent on the usage of the telephone station. For example, a hotel may provide somewhat more advanced printing capabilities to facilitate the printing of both messages and bills at stations located in guest rooms. Other applications may require only the most fundamental of printing capabilities, such as providing only the ability to print what is displayed on the station display.

I claim:

1. A digital telephone station for use with a private branch exchange (PBX) telephone system, comprising:
   a digital telephone station having a plurality of keys, transducer means for receiving speech signals from a user of said digital telephone station and reproducing speech signals from a caller to said digital telephone station, and an alphanumeric display for displaying information;
   control means for receiving digital speech signals and digital message signals from outside said digital telephone station, converting said digital speech signals into analog signals and providing said analog signals to said transducer means, and driving said alphanumeric display in response to said digital message signals, said control means further including means for providing to said alphanumeric display information indicating a telephone number dialed from said digital telephone station and information indicating the elapsed time of a telephone call;
   a printer directly coupled to said control means for printing information received from said control means; and
   mode selection means for selecting a mode of operation of said control means from among plural modes including:
   (a) a continuous mode in which digital messages from outside said digital telephone station are provided to said printer substantially immediately upon receipt of a call to said digital telephone station;
   (b) a posting mode in which messages are sent to the printer which have been previously stored in at least one of (1) said PBX system or (2) said digital telephone station; and
   (c) a print display mode in which information currently displayed on said alphanumeric display is provided to said printer, whereby a hard copy of messages and display information may be selectively provided.

2. A digital telephone station as in claim 1 wherein said control means operates in response to selection of said print display mode to initially print a telephone number dialed upon initiation of a telephone call and subsequently to print the duration of the telephone call thereby providing a hard copy indicating said telephone number dialed and duration of the telephone call.

3. A digital telephone station for use with a private branch exchange (PBX) system, comprising:
   a digital telephone station having a plurality of keys, transducer means for receiving speech signals from a suer of said digital telephone station and reproducing speech signals from a caller to said digital telephone station, and an alphanumeric display for displaying information sent to said digital telephone station;
   control means for receiving digital speech signals and digital message signals from outside said digital telephone station, converting said digital speech signals to analog signals, providing said analog signals to said transducer means, and driving said alphanumeric display in response to said digital message signals; and
   a printer directly coupled to said control means, which prints in response to said digital message signals, wherein said printer has a plurality of locally determined operating modes and wherein said PBX system can store a plurality of digital messages for said digital telephone station and wherein said control means includes means for causing said PBX system to transmit said stored messages to said digital telephone station for printing.

4. A digital telephone station as in claim 3 wherein said control means includes means for causing printing of a digital message substantially immediately upon receipt at said digital telephone station, and further including mode selection means for selecting whether to print messages immediately upon receipt or to request that said PBX system transmit messages previously stored in said PBX system.

5. A digital telephone station as in claim 3 wherein said control means includes an interface which converts analog speech signals to digital speech signals to be transmitted, which converts received digital speech signals to analog speech signals, and which transmits digital signals including said digital speech signals to be transmitted to a PBX system associated with said digital telephone station; and
   a local processor coupled to said interface, said alphanumeric display and said printer, wherein said local processor controls said alphanumeric display and said printer.

6. A digital telephone station as in claim 3 wherein said control means includes means for causing printing of a message substantially immediately upon receipt of a digital message at said digital telephone station.

7. A digital telephone station as in claim 3 wherein said control means includes a memory used to store a plurality of digital messages received at said digital telephone station and means for subsequently retrieving stored messages from said memory and causing said stored messages to be printed by said printer.

8. A digital telephone station as in claim 7 wherein said control means includes means for causing printing of a message substantially immediately upon receipt of a digital message at said digital telephone station, and further including mode selection means for causing messages to be printed as received or for causing said printer to print previously stored messages.

9. A digital telephone station as in claim 3 wherein said control means includes means for causing said printer to print information displayed on said alphanumeric display at any point in time.

10. A digital telephone station as in claim 9 wherein said control means includes means for causing display on said alphanumeric display of a telephone number dialed from said digital telephone station and the elapsed time of a telephone call between said digital telephone station and another telephone, whereby either or both of the number dialed and the elapsed time may be printed.

11. A digital telephone station as in claim 3 including an enclosure for said printer which is separate from said digital telephone station.

12. A digital telephone station as in claim 11 wherein said printer includes a CPU for communicating with said control means of said digital telephone station, wherein said CPU controls the printing operation.

13. A digital telephone station as in claim 12 wherein said printer includes at least one operation key coupled to said CPU for selecting a mode of operation for said printer.

14. A private branch exchange (PBX) system, comprising:
   a central PBX control station;
   at least one digital telephone unit connected to said central PBX control station said at least digital telephone unit including a plurality of keys, a handset having an analog transducer for receiving speech input, an encoder used to digitally encode said speech input, a local processor for controlling said digital telephone unit, and an alphanumeric display;
   a common message storage facility coupled to said central PBX control station, said common message storage facility for digitally storing voice data transmitted from said at least one digital telephone unit to said common message storage facility; and
   at least one printer, said at least one printer is directly coupled to said local processor of said at least one digital telephone unit for selectively printing information.

15. The PBX system of claim 1 wherein said at least one digital telephone unit sends and receives both digital control signals and speech signals over a line coupling said at least one digital telephone unit to said central PBX control station.

16. The PBX system of claim 15 wherein a power signal is provided to said at least one digital telephone unit over said line coupling said at least one digital telephone unit to said central PBX control station.

17. The PBX system of claim 15 wherein said at least one digital telephone unit further includes an interface which separates said digital control signals from said speech signals.

18. The PBX system of claim 17 wherein said digital control signals are provided to said local processor of said at least one digital telephone unit over a bus line.

19. The PBX system of claim 15 wherein said at least one digital telephone unit further includes an interface which separates power signals from said speech signals.

20. The PBX system of claim 1 wherein said at least one printer uses a line length substantially equal to the line length of said alphanumeric display.

21. A PBX system in accordance with claim 1 wherein said at least one digital telephone unit further includes an interface for receiving both speech signals and digital messages from said central PBX control station and wherein said digital messages may be displayed on said alphanumeric display or may be printed by said at least one printer.

22. A PBX system in accordance with claim 1 wherein said local processor causes said alphanumeric display to display current date and time of day information.

23. The PBX system of claim 1 wherein said at least one printer operates under software control to record all messages transmitted to said at least one digital telephone unit.

* * * * *